3,139,508
GAS SHIELDED ELECTRIC ARC WELDING
Norman D. Freeman, Scotch Plains, Frank T. Stanchus, West Orange, and Robert T. Telford, Morris Plains, N.J., assignors to Union Carbide Corporation, a corporation of New York
No Drawing. Filed Oct. 12, 1962, Ser. No. 230,251
8 Claims. (Cl. 219—74)

This invention relates to consumable electrode electric arc welding and, more particularly, to gas shielded electric welding of low alloy, high strength impact steels such as for example the steels known commercially as HY–80 and T–1.

A welding process of the type contemplated by the present invention is disclosed by Muller et al., Patent No. 2,504,868 and by Tuthill et al., Patent No. 2,886,696. Reference should be made to these patents for a complete disclosure of the welding process upon which the present invention is an improvement.

High impact steels such as HY–80, a typical chemical analysis of which is given below, has found widespread use, especially in the construction of nuclear powered submarines:

*Table I.—Composition of Hy–80*

| | | Weight percent |
|---|---|---|
| C | max | 0.23 |
| Mn | | 0.10–0.40 |
| P | max | 0.035 |
| S | max | 0.040 |
| Si | | 0.15–0.35 |
| Ni | | 2.00–3.25 |
| Cr | | 0.90–1.85 |
| Mo | | 0.20–0.60 |
| V | max | 0.03 |
| Cu | max | 0.25 |
| Ti | max | 0.02 |

One of the main reasons for the acceptance of HY–80 steel is that good mechanical properties can be obtained with this metal; properties which, in most instances, meet specifications set by the Navy for submarine construction.

Up until now there has not been available a gas shielded process for all-position welding of steels, such as HY–80, which can produce welds which will meet the specifications set by the military.

Vertical and overhead position welding have been especially difficult with the gas shielded process. In the process described in the Tuthill patent, a short arc length is maintained in carbon dioxide shielding atmosphere. Pure carbon dioxide shielding can not be used to weld HY–80 because the tensile and impact properties are reduced below the minimum accepted values.

Therefore, it is a main object of this invention to provide a gas shielded consumable electrode process for all-position welding HY–80 type steel.

A further object is to provide a process for all-position welding HY–80 type steels wherein the metal transfer from a consumable wire electrode to the work is by repetitive short circuits.

Another object is to provide an all-position welding process for HY–80 type steels wherein the impact properties obtained are approximately double that heretofore obtainable with the prior art processes.

These and other objects will be pointed out or become apparent from the following description of the invention:

As was pointed out above, pure carbon dioxide shielding gas has deleterious effects on the weld metal ductility and impact strengths. One solution to the problem has been to mix about 20 percent carbon dioxide with 80 percent argon. While this mixture gave suitable arc characteristics, the impact properties of weld deposit were considered to be inadequate.

We have discovered a process for welding steels such as HY–80 in all positions whereby the impact strength obtainable in the weld deposit are more than double those obtainable with the prior art.

In a general way, our invention resides in a gas shielded electric arc all-position welding process for plate having the following general composition expressed in percent by weight:

*Table II.—General Plate Composition*

| | | Weight percent |
|---|---|---|
| C | max | 0.30 |
| Mn | | 0.10–1.50 |
| Si | | 0.15–0.70 |
| Ni | max | 3.25 |
| Cr | | 0.40–1.80 |
| Mo | | 0.15–0.60 |

The remainder of the steel is substantially iron although it may contain small amounts of such elements as copper, tin, lead, boron, titanium, and vanadium with impurities such as phosphorus and sulphur. The process comprises establishing an electric arc between a ferrous metal workpiece, described above, and a consumable ferrous electrode containing by weight:

| | | Weight percent |
|---|---|---|
| C | max | 0.13 |
| Mn | | 1.00–2.50 |
| Si | | 0.10–0.75 |
| Ni | | 0.80–3.75 |
| Cr | max | 1.50 |
| Cu | max | 0.60 |
| V | max | 0.20 |
| Mo | max | 1.25 |
| S | max | 0.025 |
| P | max | 0.025 | shielding the arc and weld puddle formed on the workpiece with a stream of from 40 percent to about 98 percent helium, 1 percent to about 5 percent oxygen, and 0 to about 60 percent argon gas.

For the purpose of this disclosure, the term "all-position" means welding in the flat, horizontal, overhead, and vertical positions.

It has been found that a helium-rich gas mixture including oxygen is ideally suited for welding materials of the type defined above. Using known gas mixtures such as argon and oxygen for the out of position welding of metals, such as HY–80 steel, results in flow characteristics of the puddle which are not suitable for out of position welding. It has been found that helium additions to argon-oxygen mixtures improve wetting action and bead contour in vertical welding. Helium provides more heat to the arc and weld metal and thus, for the same size weld bead, provides a more flat weld shape. In contrast, an argon arc produces a deep fingerling penetration which is not suitable for HY-80 steel.

The gas mixture which is ideally suited for the practice of our invention consists of 60 percent helium, 38 percent argon, and 2 percent oxygen.

Two wires which are admirably suited for carrying out the process of the invention have the general chemical composition listed in Table III:

*Table III*

|  | Wire A | Wire B |
|---|---|---|
| C | 0.06 max. | 0.08 max. |
| Mn | 1.0-2.50. | 1.15-1.55 |
| P | 0.010 max. | 0.025 max. |
| S | 0.012 max. | 0.025 max. |
| Si | 0.10-0.40 | 0.35-0.65 |
| Cr | 1.50 max. | 0.30 max. |
| Ni | 1.30-3.75 | 1.15-1.55 |
| Mo | 1.25 max. | 0.30-0.60 |
| Cu |  |  |
| V | 0.03 max. | 0.10-0.20 |
| Ti | 0.003-0.10 |  |
| Zr | 0.003-0.10 |  |
| Al | 0.003-0.10 |  |

Typical apparatus for carrying out the present invention is disclosed in the Tuthill Patent No. 2,886,696.

With the above described gas mixture and wires, it is now possible to make out of position welds which have a remarkable and unexpected increase in impact strengths in steels, such as HY-80 and T-1.

In the preferred mode of operation, Wire A, listed in Table III above, is connected in circuit relation with HY-80 steel plates positioned in the vertical. The preferred power source for use in this invention, is the Linde SVI-type power supply described in U.S. Patent No. 3,054,884, issued September 18, 1962, to Mr. A. F. Manz. It is to be understood, however, that other type power supplies may be used in the practice of this invention. The Linde SVI power supply is characterized by means for selectively deriving therefrom a static volt ampere characteristic curve so as to control the magnitude of short circuit current and for coarsely setting welding circuit time constant, and a selectively variable impedance associated with the power source for finely controlling the final value of the circuit time constant and such impedance providing means for correlating the final circuit time constant with the slope of the static volt ampere characteristic.

An understanding of the magnitude of the improvement achieved by the process of the invention can be obtained from the following:

Typical welding conditions for welding ¾ in. HY-80 plate in the vertical position are as described in the example given hereinbelow:

The joint design was a single V having a 45 deg. included angle with ½ in. root opening. The weld was made in 20 passes with a 0.030 in. diameter wire having composition substantially the same as that of Wire A given in Table III. The gas shield comprised 60 percent helium, 38 percent argon, and 2 percent oxygen flowing at a total flow rate of 60 c.f.h. Current was about 130 amperes at 20 to 21 volts. Travel speed was 6 to 7 i.p.m. The power was D.C.R.P. constant potential.

Mechanical properties of the weld metal were: yield strength—106,200 p.s.i.; tensile strength—109,700 p.s.i.; percent elongation in 2 in.—24 percent; and reduction of area—71.7 percent.

Charpy V-notch impact strength at room temperature was 148 ft. lbs., at −60 degs. F., 113 ft. lbs., and at −80 degs. F., 88 ft. lbs.

The total heat input was 24,600 joules per linear inch. Nugget area was 0.040 in.$^2$ per pass.

In marked contrast, welds made under substantially identical conditions, with the exception that the shielding gas was 75 percent argon and 25 percent $CO_2$, produced impact strengths at room temperature of 75 ft. lbs. and at −80 degs. F. about 27 ft. lbs. It will be noticed that the difference in impact strength using 60 percent helium, 38 percent argon, and 2 percent oxygen is about two times the impact strength when using 75 percent argon and 25 percent $CO_2$.

While our inventive concept has been described with reference to our preferred embodiments, it is to be understood that one skilled in the art can make other embodiments within the spirit and scope of this invention.

What is claimed is:

1. A method of all-position welding a ferrous metal workpiece comprised of by weight 0.30 percent maximum carbon, 0.10 percent to 1.50 percent manganese, 0.15 percent to 0.70 percent silicon, 0.40 percent to 1.80 percent chromium, 3.25 percent maximum nickel, 0.15 to 0.60 percent molybdenum the remainder being substantially iron, said method comprising establishing an electric arc between said ferrous metal workpiece and a consumable ferrous electrode containing by weight 0.13 percent maximum carbon, 1.00 percent to 2.50 percent manganese, 0.10 percent to 0.75 percent silicon, 0.80 percent to 3.75 percent nickel, 1.50 percent maximum chromium, 0.60 percent maximum copper, 0.20 pjercent maximum vanadium, 1.25 percent max. molybdenum, 0.025 percent maximum sulphur and 0.025 percent maximum phosphorus, shielding said arc and weld puddle found in said workpiece with a stream of from 40 percent to about 98 percent helium, 1 percent to about 5 percent oxygen, and 0 to about 60 percent argon gas.

2. A method of all-position welding a ferrous metal workpiece comprised of by weight 0.30 percent maximum carbon, 0.10 percent to 1.50 percent manganese, 0.15 percent to 0.70 percent silicon, 0.40 percent to 1.80 percent chromium, 3.25 percent maximum nickel, 0.15 to 0.60 percent molybdenum, the remainder being substantially iron, said method comprising establishing an electric arc between said ferrous metal workpiece and a consumable ferrous electrode containing by weight 0.13 percent maximum carbon, 1.00 percent to 2.50 percent manganese, 0.10 percent to 0.75 percent silicon, 0.80 percent to 3.75 percent nickel, 1.50 percent maximum chromium, 0.60 percent maximum copper, 0.20 percent maximum vanadium, 1.25 percent max. molybdenum, 0.025 percent maximum sulphur, and 0.025 percent maximum phosphorus shielding said arc and weld puddle found in said workpiece with a stream of about 60 percent helium, 2 percent oxygen, and 38 percent argon.

3. A method of all-position welding a ferrous metal workpiece comprised of by weight 0.30 percent maximum carbon, 0.10 percent to 1.50 percent manganese, 0.15 percent to 0.70 percent silicon, 0.40 percent to 1.80 percent chromium, 3.25 percent maximum nickel, 0.15 to 0.60 percent molybdenum, the remainder being substantially iron, said method comprising transferring metal by a series of repetitive short circuits from a consumable ferrous electrode containing by weight 0.13 percent maximum carbon, 1.00 percent to 2.50 percent manganese, 0.10 percent to 0.75 percent silicon, 0.80 percent to 3.75 percent nickel, 1.50 percent maximum chromium, 0.60 percent maximum copper, 0.20 percent maximum vanadium, 1.25 percent max. molybdenum, 0.025 percent maximum sulphur, and 0.025 percent maximum phosphorus, to said workpiece to form a weld puddle therein, shielding said weld puddle with a stream of from about 40 percent to 98 percent helium, 1 percent to 5 percent oxygen, and 0 to about 60 percent argon gas.

4. A method of all-position welding a ferrous metal workpiece comprised of by weight 0.30 percent maximum carbon, 0.10 percent to 1.50 percent manganese, 0.15 percent to 0.70 percent silicon, 0.40 percent to 1.80 percent chromium, 3.25 percent maximum nickel, 0.15 to 0.60 percent molybdenum, the remainder being substantially iron, said method comprising transferring metal by a series of repetitive short circuits from a consumable ferrous electrode containing by weight 0.06 percent maximum carbon, 1.0 percent to 2.50 percent manganese, 0.010 percent maximum phosphorus, 0.012 percent maximum sulphur, 0.10 percent to 0.40 percent silicon, 1.50 percent maximum chromium, 1.30 percent to 3.75 percent nickel, 1.25 percent maximum molybdenum, 0.03 percent maximum vanadium, 0.003 percent to 0.10 percent titanium, 0.003 percent to 0.10 percent zirconium, and 0.003 percent to 0.10 percent aluminum to said workpiece to form a weld puddle therein, shielding said weld puddle with a stream of from about 40 percent to 98 percent helium, 1 percent to 5 percent oxygen, and 0 to about 60 percent argon gas.

5. A method of all-position welding a ferrous metal workpiece comprised of by weight 0.30 percent maximum carbon, 0.10 percent to 1.50 percent manganese, 0.15 percent to 0.70 percent silicon, 0.40 percent to 1.80 percent chromium, 3.25 percent maximum nickel, 0.15 to 0.60 percent molybdenum, the remainder being substantially iron, said method comprising impressing an electrical potential between a consumable ferrous electrode containing by weight 0.13 percent maximum carbon, 1.00 percent to 2.50 percent manganese, 0.10 percent to 0.75 percent silicon, 0.80 percent to 3.75 percent nickel, 1.50 percent maximum chromium, 0.60 percent maximum copper, 0.20 percent maximum vanadium, 1.25 percent maximum molybdenum, 0.025 percent maximum sulphur and 0.025 percent maximum phosphorus, and said workpiece in a welding circuit including a power source having means for selectively deriving therefrom a static volt-ampere characteristic curve so as to control the magnitude of short circuit current and for coarsely setting such welding circuit time constant and a selectively variable impedance associated with said power source for finely controlling the final value of the circuit time constant and such impedance providing means for correlating the final circuit time constant with the slope of the static volt-ampere characteristic, transferring metal from said consumable electrode wire to said workpiece to form a weld puddle thereon, shielding said weld puddle with a stream of from about 40 percent to 98 percent helium, 1 percent to 5 percent oxygen, and 0 to 60 percent argon.

6. A method of all-position welding a ferrous metal workpiece comprising by weight 0.23 percent maximum carbon, 0.10 percent to 0.40 percent manganese, 0.035 percent maximum phosphorus, 0.040 percent maximum sulphur, 0.15 percent to 0.35 percent silicon, 2.00 percent to 3.25 percent nickel, 0.90 percent to 1.85 percent chromium, 0.20 percent to 0.60 percent molybdenum, 0.03 percent maximum vanadium, 0.25 percent maximum copper, 0.02 percent maximum titanium, said method comprising impressing an electrical potential between said ferrous workpiece and a consumable ferrous electrode containing by weight 0.06 percent maximum carbon, 1.0 percent to 2.50 percent manganese, 0.010 percent maximum phosphorus, 0.012 percent maximum sulphur, 0.10 percent to 0.40 percent silicon, 1.50 percent maximum chromium, 1.30 percent to 3.75 percent nickel, 1.25 percent maximum molybdenum, 0.03 percent maximum vanadium, 0.003 percent to 0.10 percent titanium, 0.003 percent to 0.10 percent zirconium, and 0.003 percent to 0.10 percent aluminum in a welding circuit, transferring metal from said consumable electrode wire to said workpiece to form a weld puddle thereon, shielding said weld puddle with a stream of about 60 percent helium, 2 percent oxygen, and 38 percent argon.

7. The method according to claim 6 wherein metal transfer from said consumable electrode to said workpiece is by a series of repetitive short circuits.

8. A method according to claim 3 wherein said consumable ferrous electrode contains by weight 0.08 max. C, 1.15–1.55 Mn, 0.025 max. P, 0.025 max. S, 0.35–0.65 Si, 0.30 max. Cr, 1.15–1.55 Ni, 0.30–0.60 Mo, 0.10–0.20 V.

References Cited in the file of this patent

UNITED STATES PATENTS

| | | |
|---|---|---|
| 2,810,818 | Rathschild et al | Oct. 22, 1957 |
| 2,958,756 | Yenni et al. | Mar. 1, 1960 |